United States Patent
Young et al.

(10) Patent No.: US 11,223,521 B2
(45) Date of Patent: Jan. 11, 2022

(54) SETTING UP A NEW TELEVISION LINKED WITH AN EXISTING TELEVISION

(71) Applicant: Sony Corporation, Tokyo (JP)

(72) Inventors: David Young, San Diego, CA (US); Marvin DeMerchant, San Diego, CA (US); Lindsay Miller, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/157,026

(22) Filed: Oct. 10, 2018

(65) Prior Publication Data

US 2020/0119980 A1   Apr. 16, 2020

(51) Int. Cl.
*H04B 5/00* (2006.01)
*H04W 84/12* (2009.01)
*H04L 12/24* (2006.01)
*H04N 21/422* (2011.01)

(52) U.S. Cl.
CPC ....... *H04L 41/0803* (2013.01); *H04B 5/0031* (2013.01); *H04N 21/42204* (2013.01); *H04W 84/12* (2013.01)

(58) Field of Classification Search
CPC . H04L 41/0803; H04L 41/04; H04L 65/1069; H04L 65/1083; H04L 41/0816; H04L 41/12; H04L 41/0846; H04L 12/24; H04L 12/422; H04B 5/0031; H04B 5/00; H04W 84/12; H04N 21/42204; H04N 7/173; H04N 5/44; H04N 21/6547; H04N 21/44227; H04N 21/43615; H04N 21/632; G08C 17/02; G08C 2201/20
See application file for complete search history.

(56) References Cited

U.S. PATENT DOCUMENTS

| | | | |
|---|---|---|---|
| 9,704,113 B2 * | 7/2017 | Spencer | H04L 41/0803 |
| 9,906,841 B2 * | 2/2018 | Kim | H04N 21/25858 |
| 9,979,438 B2 * | 5/2018 | Belk | H04N 21/441 |
| 10,409,266 B2 * | 9/2019 | Satou | G05B 19/4155 |
| 2006/0221234 A1 * | 10/2006 | Mears | H04N 21/436 348/542 |
| 2010/0146579 A1 * | 6/2010 | Reams | H04N 5/765 725/131 |
| 2010/0254370 A1 * | 10/2010 | Jana | H04N 21/23439 370/352 |
| 2013/0236158 A1 * | 9/2013 | Lynch | H04N 21/440218 386/231 |
| 2014/0189910 A1 * | 7/2014 | Sanz Molinero | C12N 9/1007 800/290 |
| 2016/0080806 A1 * | 3/2016 | Ozeki | H04N 21/44222 725/14 |

(Continued)

*Primary Examiner* — Dramos Kalapodas
(74) *Attorney, Agent, or Firm* — Trellis IP Law Group, PC

(57) ABSTRACT

Implementations generally relate to setting up a new television linked with an existing television. In some implementations, a method includes detecting, by a first television, a presence of a second television. The method further includes establishing communication with the second television. The method further includes sending a setup information request to the second television. The method further includes receiving setup information from the second television. The method further includes modifying one or more settings of the first television based at least in part on the setup information from the second television.

6 Claims, 4 Drawing Sheets

(56) References Cited

U.S. PATENT DOCUMENTS

2017/0236408 A1\* 8/2017 Naqvi .................... G08C 23/04
                                                                                340/12.3
2017/0264947 A1\* 9/2017 Gerhards ........... H04N 21/6143

\* cited by examiner

SETTING UP A NEW TELEVISION LINKED WITH AN EXISTING TELEVISION

BACKGROUND

Setup of a television can be a lengthy and frustrating process. Using a television remote to enter text is difficult and not intuitive. Some televisions allow a user to use a mobile device to go through a television setup. However, it is still a lengthy and frustrating process to set a television up.

SUMMARY

Implementations generally relate to setting up a new television linked with an existing television. In some implementations, a system includes one or more processors, and includes logic encoded in one or more non-transitory computer-readable storage media for execution by the one or more processors. When executed, the logic is operable to perform operations including detecting, by a first television, a presence of a second television; establishing communication with the second television; sending a setup information request to the second television; receiving setup information from the second television; and modifying one or more settings of the first television based at least in part on the setup information from the second television.

With further regard to the system, in some implementations, the first television is a new television of a user, and wherein the second television is an existing television of the user. In some implementations, the setup information includes television settings. In some implementations, the setup information includes user preferences. In some implementations, the setup information includes account information. In some implementations, the logic when executed is further operable to perform operations comprising displaying a prompt to a user to confirm the setup information. In some implementations, communication is established via a local network.

In some embodiments, a non-transitory computer-readable storage medium with program instructions thereon is provided. When executed by one or more processors, the instructions are operable to perform operations including detecting, by a first television, a presence of a second television; establishing communication with the second television; sending a setup information request to the second television; receiving setup information from the second television; and modifying one or more settings of the first television based at least in part on the setup information from the second television.

With further regard to the computer-readable storage medium, in some implementations, the first television is a new television of a user, and wherein the second television is an existing television of the user. In some implementations, the setup information includes television settings. In some implementations, the setup information includes user preferences. In some implementations, the setup information includes account information. In some implementations, the instructions when executed are further operable to perform operations comprising displaying a prompt to a user to confirm the setup information. In some implementations, communication is established via a local network.

In some implementations, a method includes detecting, by a first television, a presence of a second television. The method further includes establishing communication with the second television. The method further includes sending a setup information request to the second television. The method further includes receiving setup information from the second television. The method further includes modifying one or more settings of the first television based at least in part on the setup information from the second television.

With further regard to the method, in some implementations, the first television is a new television of a user, and wherein the second television is an existing television of the user. In some implementations, the setup information includes television settings. In some implementations, the setup information includes user preferences. In some implementations, the setup information includes account information. In some implementations, the method further includes displaying a prompt to a user to confirm the setup information.

A further understanding of the nature and the advantages of particular implementations disclosed herein may be realized by reference of the remaining portions of the specification and the attached drawings.

DETAILED DESCRIPTION

Implementations described herein facilitate the setting up a new television linked with an existing television. In various implementations, when a new television is turned on, the new television detects the presence of an existing television via a local network. The new television establishes communication with the existing television. The new television sends a setup information request to the existing television. For example, in some implementations, the setup information may include television settings, user preferences, and account information. The new television receives setup information from the existing television. The new television then modifies one or more settings of the new television based at least in part on the setup information from the existing television.

Figure 1:
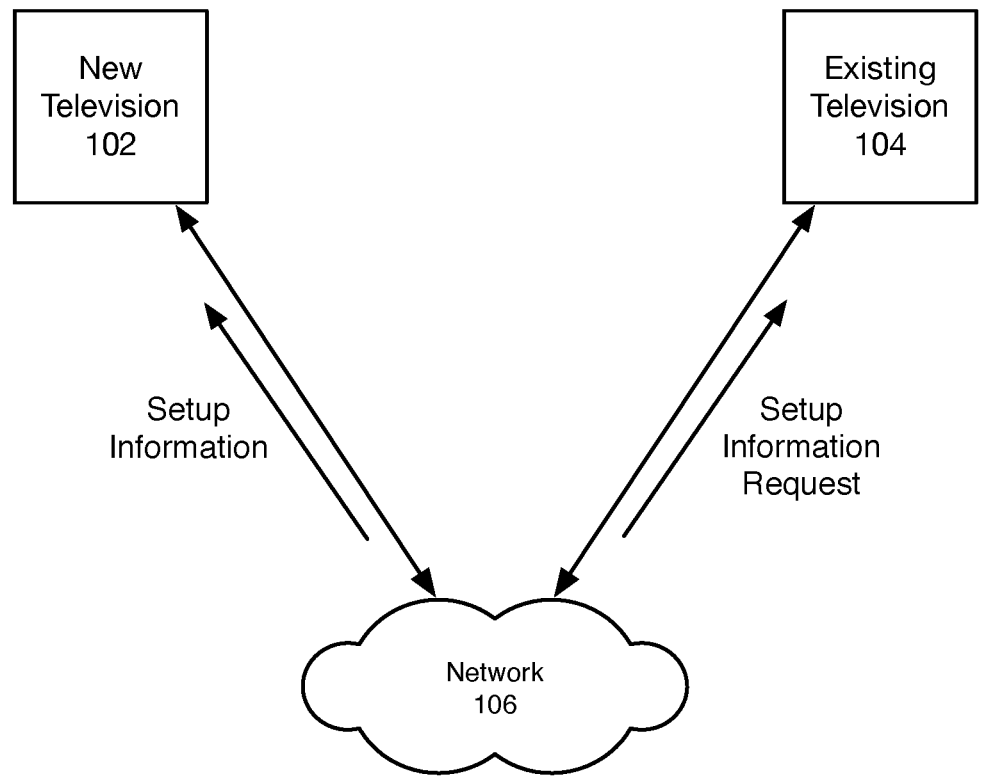
FIG. 1 illustrates a block diagram of an example media environment 100, which may be used for some implementations described herein.

FIG. 1 illustrates a block diagram of an example media environment 100, which may be used for some implementations described herein. In some implementations, media environment 100 includes a new television 102, an existing television 104, which includes communication with each other via a network 106. In various implementations, communication is established via a local network. For example, the network may be a Wi-Fi network, a Bluetooth network, near-field communication (NFC) network, etc. In some implementations, the network may be the Internet.

As described in more detail herein, new television 102 (e.g., newly acquired, newly purchased, etc.) establishes communication with existing television 104. When a user first turns new television 102 on, new television 102 detects the presence of existing television 104 via a network such as network 106. New television 102 sends a setup information request to existing television 104 via network 106. In response, existing television 104 sends setup information to new television 102 via network 106. Various example implementations are described in detail herein.

Figure 2:
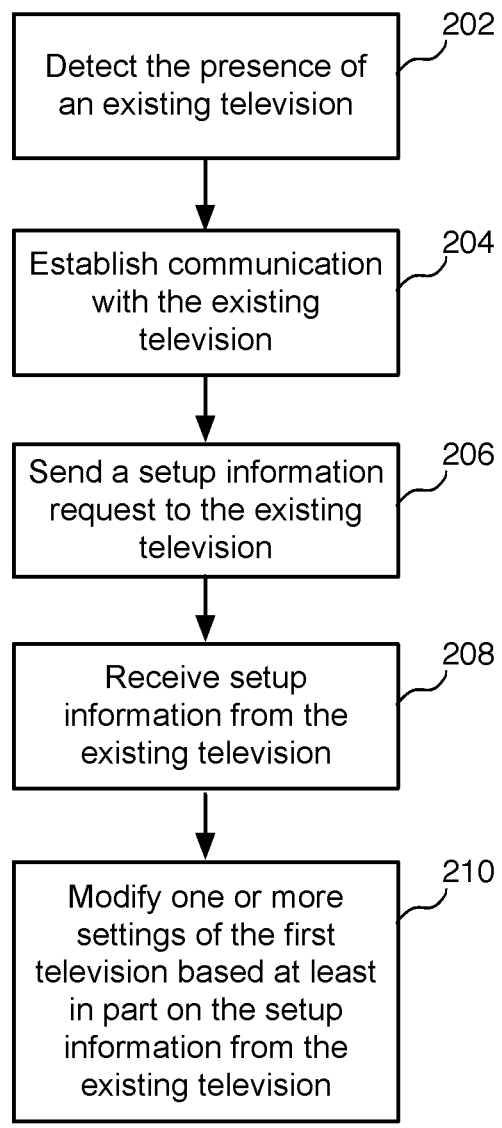
FIG. 2 illustrates an example flow diagram for setting up a new television linked with an existing television, according to some implementations.

FIG. 2 illustrates an example flow diagram for setting up a new television linked with an existing television, according to some implementations. Referring to both FIGS. 1 and 2, a method is initiated at block 202, where the system such as the new television detects the presence of an existing television. For example, when a user introduces a new television into their home and turns it on, the new TV automatically, without user intervention, detects if another/existing television is present. In various implementations, the existing television may be in a sleep mode and wake up when the new television establishes communication with the existing television. In some implementations, if no existing television is detected, the new television may prompt the user whether there is an existing television, and, if so, to turn on any existing (already programmed) television for communication with the new television.

At block 204, the system establishes communication with the existing television. At block 206, the system sends a setup information request to the existing television. The setup information request may include a request for some or all setup information. In various implementations, the setup information may include television settings. In various implementations, the setup information may include user preferences. In various implementations, the setup information may include account information. In some implementations, the setup information may include apps available on the existing television. In some implementations, the setup information may include set information for other media devices such as soundbars, speakers, etc. In some implementations, the setup information may include setup information for existing media devices such as a soundbar, speakers, etc.

At block 208, the system receives setup information from the existing television. In various implementations, the system may display a prompt to a user to confirm the setup information. For example, in some implementations, the prompt may ask the user to confirm if the setup information is correct or up-to-date. The prompt may ask the user of the user wants the system to transfer the setup information from the existing television to the new television.

At block 210, the system modifies one or more settings of the first television based at least in part on the setup information from the second television. As a result, the system transfers some or all settings from the existing television to the new television, freeing the user from needing to go through a setup process.

As indicated above, in various implementations, communication between the new television and the existing television is established via a local network, such as a Wi-Fi network, a Bluetooth network, near-field communication (NFC) network, etc. In some implementations, the new television and the existing television may remain linked. This enables automatic updates in new user preferences, favorites, settings, etc. between the two televisions. As a result, the two televisions (or other televisions connected to the network) may remain synced with the user's viewing preferences.

Implementations described herein provide various benefits. For example, implementations eliminate the need for a user to set up a new television. The user is able to enjoy a television immediately upon unboxing the television.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While some implementations are described herein in the context of the new television performing steps of FIG. 2, in other implementations, other devices may perform the steps. For example, in some implementations, the existing television may detect the new television when the new television is turned on. The existing television may send a request for the new television to receive setup information. In some implementations, the existing television may cause the new television to prompt the user if the user would like the setup information to be automatically transferred from the existing television to the new television. If so, the existing television proceeds to send the setup information to the new television.

In another example implementation, a mobile device such as a smartphone or tablet or a television remote control may perform steps of FIG. 2. For example, in some implementations, a mobile device may detect both the new television and the existing television. The mobile device may send a request for the existing television to send setup information and for the new television to receive the setup information. As with the example above, in some implementations, the mobile device may cause the new television to prompt the user if the user would like the setup information to be automatically transferred from the existing television to the new television. If so, the existing television proceeds to send the setup information to the new television.

In some implementations, the new television could be a television that the user is using temporarily such as a television in a hotel room. In this particular example, a mobile device may detect the new television. In some implementations, the mobile device may store the setup information and transfer the setup information to the new television. In some implementations, the mobile device may communicate via the Internet with the existing television at the user's home. The mobile device may then cause the transfer of the setup information from the existing television to the new television. In this example implementation, the setup information may expire after a predetermined time period or manually by the user.

In some implementations, both televisions may be new, where one television is set up first, and the system transfers setup information from the television that has already been set up to the television that has not yet been set up.

Figure 3:
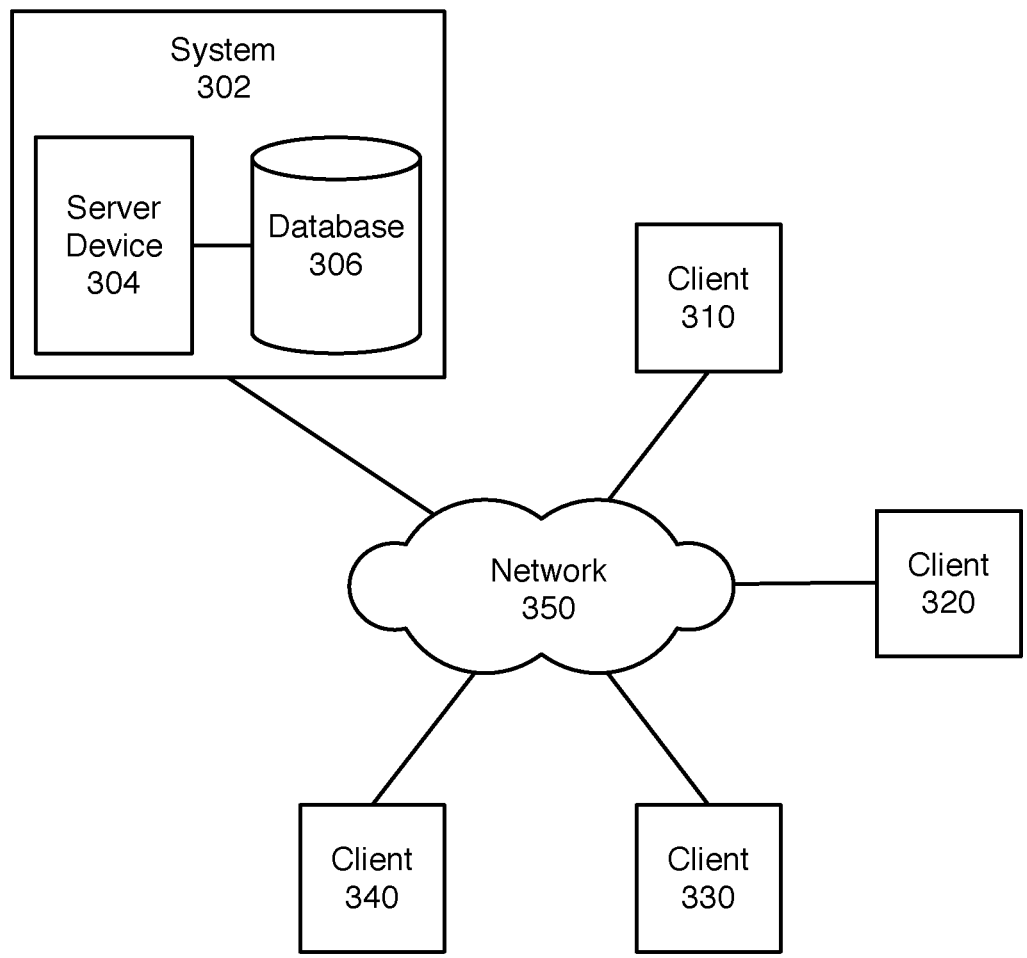
FIG. 3 illustrates a block diagram of an example network environment, which may be used for some implementations described herein.

FIG. 3 illustrates a block diagram of an example network environment 300, which may be used for some implementations described herein. In some implementations, network environment 300 includes a system 302, which includes a server device 304 and a network database 306. Network environment 300 also includes client devices 310, 320, 330, and 340, which may communicate with each other directly or via system 302. Client devices 310, 320, 330, and 340 may be televisions, as well as other media devices such as a media players, soundbar, speakers, etc. Network environment 300 also includes a network 350.

For ease of illustration, FIG. 3 shows one block for each of system 302, server device 304, and network database 306, and shows four blocks for client devices 310, 320, 330, and 340. Blocks 302, 304, and 306 may represent multiple systems, server devices, and network databases. Also, there may be any number of client devices. In other implementations, network environment 300 may not have all of the components shown and/or may have other elements including other types of elements instead of, or in addition to, those shown herein.

In the various implementations described herein, a processor of system 302 and/or a processor of any client device 310, 320, 330, and 340 causes the elements described herein (e.g., information, etc.) to be displayed in a user interface on one or more display screens.

Implementations may apply to any network system and/or may apply locally for an individual user. For example, implementations described herein may be implemented by system 102 and/or any client device 310, 320, 330, and 340. System 302 may perform the implementations described herein on a stand-alone computer, tablet computer, smartphone, etc. System 302 and/or any of client devices 310, 320, 330, and 340 may perform implementations described herein individually or in combination with other devices.

Figure 4:
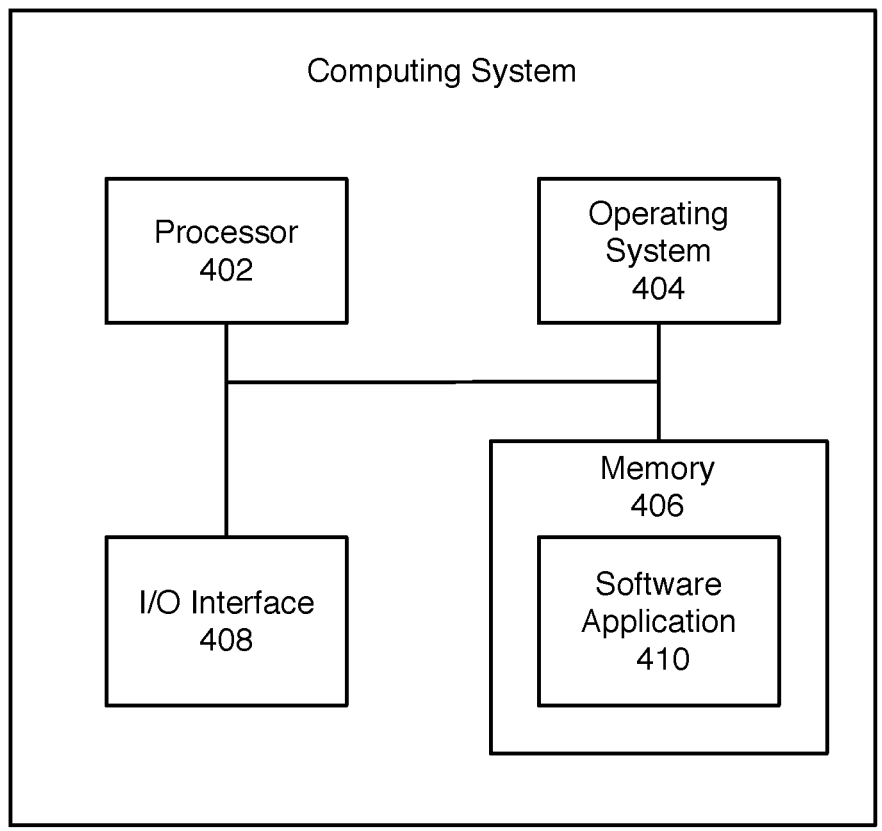
FIG. 4 illustrates a block diagram of an example computing system, which may be used for some implementations described herein.

FIG. 4 illustrates a block diagram of an example computing system 400, which may be used for some implementations described herein. For example, computing system 400 may be used to implement television 102 of FIG. 1 and/or server device 304 of FIG. 3, as well as to perform implementations described herein. In some implementations, computing system 400 may include a processor 402, an operating system 404, a memory 406, and an input/output (I/O) interface 408. In various implementations, processor 402 may be used to implement various functions and features described herein, as well as to perform the method implementations described herein. While processor 402 is described as performing implementations described herein, any suitable component or combination of components of computing system 400 or any suitable processor or processors associated with computing system 400 or any suitable system may perform the steps described. Implementations described herein may be carried out on a user device, on a server, or a combination of both.

Computing system 400 also includes a software application 410, which may be stored on memory 406 or on any other suitable storage location or computer-readable medium. Software application 410 provides instructions that enable processor 402 to perform the implementations described herein and other functions. Software application may also include an engine such as a network engine for performing various functions associated with one or more networks and network communications. The components of computing system 400 may be implemented by one or more processors or any combination of hardware devices, as well as any combination of hardware, software, firmware, etc.

For ease of illustration, FIG. 4 shows one block for each of processor 402, operating system 404, memory 406, I/O interface 408, and software application 410. These blocks 402, 404, 406, 408, and 410 may represent multiple processors, operating systems, memories, I/O interfaces, and software applications. In various implementations, computing system 400 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to perform operations comprising:
detecting, by a first television, a presence of a second television;
establishing communication with the second television;
sending a request for setup information to the second television, wherein the setup information comprises setup information for the second television and setup information for one or more non-television media devices, wherein the setup information includes account information, and wherein the setup information further comprises one or more applications available on the second television;
receiving the setup information from the second television;
displaying a prompt to a user, wherein the prompt asks the user to confirm if the setup information is correct;
transferring the setup information including the one or more applications to the first television;
modifying one or more settings of the first television based at least in part on the setup information from the second television; and
maintaining ongoing communication with the second television, wherein the ongoing communication enables automatic updates in one or more of new user preferences, favorites, and television settings between the first television and the second television, and wherein the first television and the second television remain synced with viewing preferences of the user.

2. The system of claim 1, wherein the first television is a new television of a user, and wherein the second television is an existing television of the user, wherein the setup information comprises setup information for one or more of soundbars and speakers, wherein the setup information includes user preferences, and wherein the prompt asks the user to confirm if the user wants the setup information transferred from the second television to the first television, and wherein communication is established via a local network.

3. A non-transitory computer-readable storage medium with program instructions stored thereon, the program instructions when executed by one or more processors are operable to perform operations comprising:
detecting, by a first television, a presence of a second television;
establishing communication with the second television;
sending a request for setup information to the second television, wherein the setup information comprises setup information for the second television and setup information for one or more non-television media devices, wherein the setup information includes account information, and wherein the setup information further comprises one or more applications available on the second television;
receiving the setup information from the second television;
displaying a prompt to a user, wherein the prompt asks the user to confirm if the setup information is correct;
transferring the setup information including the one or more applications to the first television;
modifying one or more settings of the first television based at least in part on the setup information from the second television; and
maintaining ongoing communication with the second television, wherein the ongoing communication enables automatic updates in one or more of new user preferences, favorites, and television settings between the first television and the second television, and wherein the first television and the second television remain synced with viewing preferences of the user.

4. The computer-readable storage medium of claim 3, wherein the first television is a new television of a user, and wherein the second television is an existing television of the user, wherein the setup information comprises setup information for one or more of soundbars and speakers, wherein the setup information includes user preferences, and wherein the prompt asks the user to confirm if the user wants the setup information transferred from the second television to the first television, and wherein communication is established via a local network.

5. A computer-implemented method comprising:
detecting, by a first television, a presence of a second television;
establishing communication with the second television;
sending a request for setup information to the second television, wherein the setup information comprises setup information for the second television and setup information for one or more non-television media devices, wherein the setup information includes account information, and wherein the setup information further comprises one or more applications available on the second television;
receiving the setup information from the second television;
displaying a prompt to a user, wherein the prompt asks the user to confirm if the setup information is correct;
transferring the setup information including the one or more applications to the first television;
modifying one or more settings of the first television based at least in part on the setup information from the second television; and
maintaining ongoing communication with the second television, wherein the ongoing communication enables automatic updates in one or more of new user preferences, favorites, and television settings between the first television and the second television, and wherein the first television and the second television remain synced with viewing preferences of the user.

6. The method of claim 5, wherein the first television is a new television of a user, and wherein the second television is an existing television of the user, wherein the setup information comprises setup information for one or more of soundbars and speakers, wherein the setup information includes user preferences, and wherein the prompt asks the user to confirm if the user wants the setup information transferred from the second television to the first television, and wherein communication is established via a local network.

\* \* \* \* \*